United States Patent [19]

Tatsuzawa et al.

[11] Patent Number: 4,802,032

[45] Date of Patent: Jan. 31, 1989

[54] SERVO FOR VTR DRUM MOTOR WITH EXTERNAL REFERENCE SIGNAL PHASE MODULATION

[75] Inventors: Kaichi Tatsuzawa; Takao Abe; Tetsuo Ogawa, all of Kanagawa, Japan

[73] Assignee: Sony Corporation, Tokyo, Japan

[21] Appl. No.: 63,800

[22] Filed: Jun. 23, 1987

Related U.S. Application Data

[63] Continuation of Ser. No. 823,082, Jan. 27, 1986, abandoned.

[30] Foreign Application Priority Data

Jan. 31, 1985 [JP] Japan .................. 60-17121

[51] Int. Cl.$^4$ ............................................. G11B 5/02
[52] U.S. Cl. ............................. 360/77.13; 360/19.1; 360/33.1; 360/37.1
[58] Field of Search ................ 360/33.1, 27, 37.1, 360/75, 77, 19.1

[56] References Cited

U.S. PATENT DOCUMENTS

| | | | |
|---|---|---|---|
| 3,686,469 | 8/1972 | Clark et al. | 360/27 X |
| 3,845,500 | 10/1974 | Hart | 360/77 |
| 3,964,094 | 6/1976 | Hart | 360/77 |
| 4,011,587 | 3/1977 | Arter et al. | 360/77 X |
| 4,044,388 | 8/1977 | Metzger . | |
| 4,254,367 | 3/1981 | Sakamoto . | |
| 4,285,017 | 8/1981 | Arter et al. | 360/77 |
| 4,542,351 | 9/1985 | Okada | 360/37.1 X |
| 4,660,103 | 4/1987 | Wilkinson et al. | 360/19.1 X |
| 4,665,447 | 5/1987 | Odaka | 360/77 |

FOREIGN PATENT DOCUMENTS

| | | | |
|---|---|---|---|
| 113986 | 7/1984 | European Pat. Off. . | |
| 57-75086 | 11/1982 | Japan | 360/33.1 |
| 2111293 | 6/1983 | United Kingdom | 360/33.1 |

OTHER PUBLICATIONS

Publication in the Patent Abstracts of Japan, vol. 7, No. 176, Aug. 4, 1983.

*Primary Examiner*—Aristotelis M. Psitos
*Attorney, Agent, or Firm*—Lewis H. Eslinger; Jay H. Maioli

[57] ABSTRACT

A servo circuit is provided for use with a reproducing apparatus wherein an information signal is reproduced from an elongated slant track formed on a tape which is wrapped on the periphery of a guide drum having a rotary head. The servo circuit includes a circuit for detecting an intermediate point of the length of the slant track and generating a timing signal at the detection of the intermediate point and a circuit for comparing the timing signal with a reference pulse to generate a control signal. A relative position of the slant track to the rotary head is controlled in accordance with the control signal.

13 Claims, 3 Drawing Sheets

SERVO FOR VTR DRUM MOTOR WITH EXTERNAL REFERENCE SIGNAL PHASE MODULATION

This is a continuation of application Ser. No. 823,082, filed Jan. 27, 1986, now abandoned.

BACKGROUND OF THE INVENTION

1. Field of the Invention

The present invention relates generally to a servo circuit and, more particularly, is directed to a servo circuit suitable for use with an information signal reproducing apparatus such as a digital or analog VTR (video tape recorder) and so on.

2. Description of the Prior Art

Initially, a prior art digital VTR and its servo circuit will be described in brief.

In the digital VTR, if a video signal to be recorded is an NTSC video signal, each field of the video signal is separated into five portions and this separated video signal is recorded on a magnetic tape by two pairs of rotary magnetic heads, each being mounted with an angular spacing of 180° therebetween, so as to form a pair of slant tracks for each 1/5 field.

Upon reproduction in a recording and reproducing apparatus, a segment pulse occurring every 1/5 field formed from a reference video signal generated from a video processor and a rotation detecting signal (having a period 1/5 of the field period) from a drum rotor are phase-compared and using the compared output therefrom, the rotation of drum motor is controlled to thereby provide a servo for the drum motor.

In such a conventional digital VTR, however, the servo is not sufficient and due to various unstable factors, upon reproduction digital data near the starting point of the slant track will frequently not be reproduced. As a result, a defect exists in that the dropped-out digital data can not be corrected for error in the vertical direction and hence error concealment is required. The drop-out of such reproduced digital data can not be detected the original reproduced picture but can be remarkably noticable in a reproduced picture based on a dubbed one.

Similarly in the prior art analog VTR, the servo is not satisfactory so that if a video signal on one slant track (one field) is reproduced while a part thereof is dropped out, the reproduced picture is deteriorated in quality.

OBJECTS AND SUMMARY OF THE INVENTION

Accordingly, it is a general object of the present invention to provide an improved servo circuit for use with an information signal reproducing apparatus.

A specific object of the present invention is to provide a servo circuit for use with an information signal reproducing apparatus in which an information signal recorded on a slant track of a magnetic tape can be positively reproduced without a drop-out.

Another object of the present invention is to provide a servo circuit for use with a recording and reproducing apparatus such as a digital VTR (video tape recorder) and an analog VTR.

According to one aspect of the present invention, a servo circuit for use with a reproducing apparatus wherein an information signal is reproduced from an elongated slant track formed on a tape which is wrapped on a periphery of a guide drum having a rotary head, comprises means for detecting an intermediate point of the elongated slant track and generating a timing signal at the detection of the intermediate point, means for comparing the timing signal with a reference pulse to generate a control signal and means for controlling a relative position of said slant track relative to the rotary head in accordance with the control signal.

According to another aspect of the present invention, a servo circuit for use with a reproducing apparatus wherein an information signal is reproduced from an elongated slant track formed on a tape which is wrapped on a periphery of a guide drum having a rotary head comprises means for detecting an intermediate point of the elongated slant track and generating a timing signal at the detection of the intermediate point; means for providing a reference pulse;

means for detecting a phase difference between the timing signal and reference pulse;

means for phase-modulating said reference pulse in accordance with the phase difference;

means for generating a position indicating signal corresponding to the rotational position of the rotary head;

means for comparing a phase of the phase-modulated reference pulse with that of the position indicating signal of the rotary head to generate a control signal in accordance therewith;

a motor for driving the rotary head; and means for controlling a rotation of a motor in response to said control signal, the rotary head being driven by said motor.

These and other objects, features and advantages of the present invention will become apparent from the following detailed description of the preferred embodiment taken in conjunction with the accompanying drawings.

DESCRIPTION OF THE PREFERRED EMBODIMENTS

A first embodiment of a servo circuit according to the present invention will hereinafter be described in detail with reference to FIG. 1, in which this invention is applied to a digital VTR.

Figure 1:
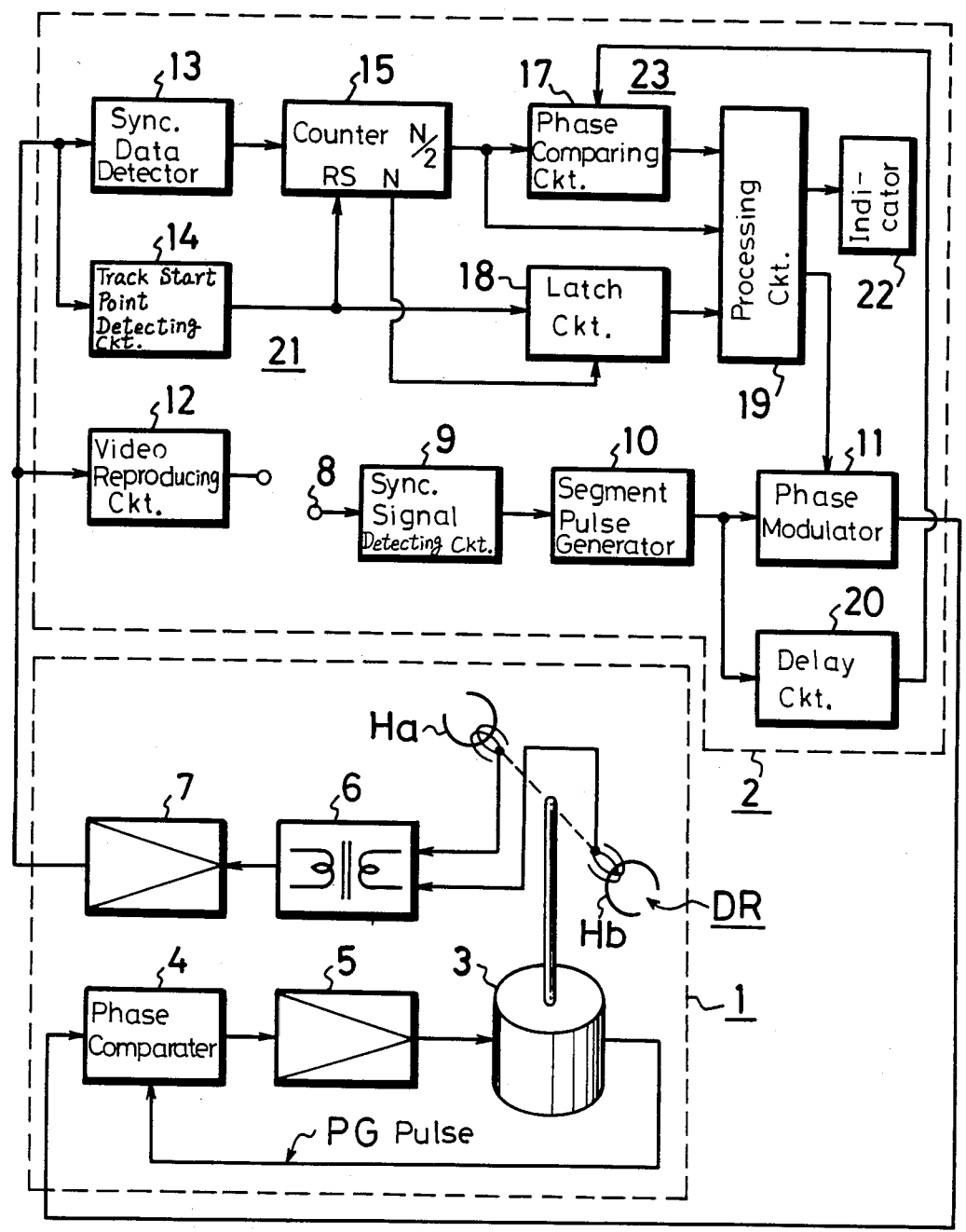
FIG. 1 is a block diagram showing an embodiment of a servo circuit according to the present invention.

In FIG. 1, a recording and reproducing apparatus 1 and a processor 2 are illustrated. Recording and reproducing apparatus 1 and processor 2 are connected with each other via a cable for transmission of the indicated signals.

Recording and reproducing apparatus 1 will be described first. In recording and reproducing apparatus 1, a tape guide drum apparatus DR includes a fixed drum and a rotary drum reproducing rotary magnetic heads Ha and Hb mounted to the rotary drum with an angular spacing of 180° therebetween. Each of these rotary magnetic heads Ha and Hb is formed having magnetic heads of 2 channels provided in close relation to each other. In this embodiment, other rotary magnetic heads, such as recording rotary magnetic heads and so on, are not shown. A drum motor 3 directly drives the rotary drum in rotation.

Reproduced signals from reproducing rotary magnetic heads Ha and Hb are supplied through a rotary transformer 6 to an amplifier 7. The output from amplifier 7 is fed to processor 2. Amplifier 7 may be incorporated in the rotary drum and in that case amplifier 7 is located before rotary transformer 6.

A rotation detecting signal having the same period as the period of a reference signal generated from every slant track when drum motor 3 is rotated at the normal speed, that is, 1/5 the field period, is generated from a pulse generator (not shown) mounted on drum motor 3 (or the rotary drum) and together with an output signal from a phase modulating circuit 11 in processor 2, which will be described later, is supplied to and phase-compared in a phase comparator circuit 4. The compared output from phase comparator circuit 4 is supplied through an amplifier 5 to drum motor 3 to thereby effect the servo for drum motor 3.

While this recording and reproducing apparatus 1 idditionally includes a capstan apparatus, a servo circuit thereof, a loading mechanism for winding a magnetic tape, incorporated in a tape cassette, around a tape guide drum and disengaging the same therefrom, a tape running guide mechanism and so on, they do not form part of the invention and will not be shown and described.

Figure 2:
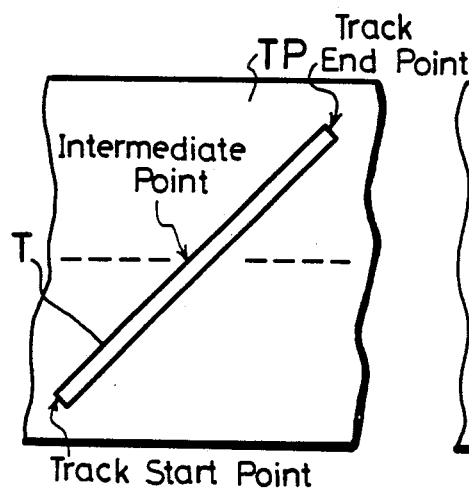
FIGS. 2 and 3 are respectively pattern diagrams showing track patterns formed on a magnetic tape.

Prior to describing processor 2, a track pattern on magnetic tape TP and the format of a digital video signal recorded thereon will be described with reference to FIGS. 2 to 5. In FIG. 2, reference letter T designates one slant track on which two blocks of video signal data, each including 1/5 field, are recorded.

Figure 4:
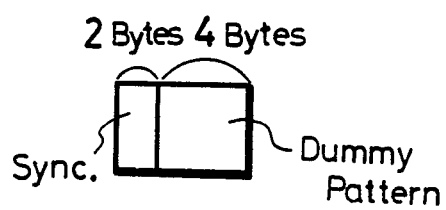
FIGS. 4 and 5 are diagrams showing formats of a synchronizing block, respectively.
Figure 5:
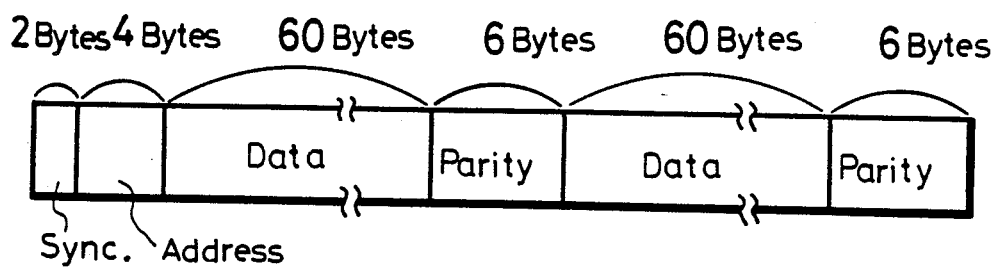

On each slant track T, there is recorded a block of digital data which is formed of, for example, 330 sync. blocks. At the starting point of the length of elongated slant track T, as shown in FIG. 4, there are recorded a block synchronizing signal (block sync.) of 2 original bytes and a leading sync. block having a dummy pattern of 4 bytes succeeding the former. Thereafter, a normal sync. block is repeatedly recorded. The normal sync. block is formed of an original block synchronizing signal (block sync.) of 2 bytes, a block address of 4 bytes following thereto, component video data of 60 bytes, a parity signal of 6 bytes, component video data of 60 bytes and a parity signal of 6 bytes in this sequential order as shown in FIG. 5.

Figure 3:
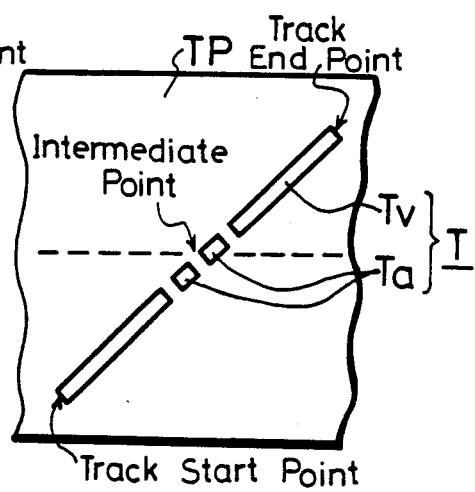

When an even number of audio tracks Ta are interposed at a middle portion of a video track Tv slant track T as shown in FIG. 3, the block construction of the recorded digital data is the same as described in connection with FIGS. 4 and 5 except for the fact that the audio data is inserted into part of the video data.

Turning back to FIG. 1, processor 2 will be described. A reference video signal from outside is supplied through an input terminal 8 to a synchronizing detecting circuit 9 in which the horizontal and vertical synchronizing signals are detected. The detected output therefrom is supplied to a segment pulse generating circuit 10 which generates a segment pulse at every slant track and which has 1/5 field period when the video signal is in the NTSC system. The semgne pulse thus generated by segment pulse generating circuit 10 is fed to a phase modulating circuit 11.

The reproduced output from amplifier 7 of recording and reproducing apparatus 1 is supplied to a video reproducing circuit 12, to a sync. data detecting circuit 13 to a track starting point detecting circuit 14 which together constitute a timing detector means 21 processor 2.

Timing detector means 21 which detects a substantially intermediate point of the length of elongated slant track T will now be descrinbed. In sync. data detecting circuit 13, each block synchronizing signal (sync. block) is detected in the reproduced signal and is fed to and counted by a counter 15. The counted result from counter 15 is supplied to a processing circuit 19.

In track starting point detecting circuit 14, the dummy pattern of the leading sync. block shown in FIG. 4 is detected to thereby detect the starting point of slant track T. The detected output therefrom is supplied to counter 15 as a reset signal.

Since each of the rotary magnetic heads Ha and Hb is formed having magnetic heads of 2 channels, it is only necessary for a reproduced output from the magnetic head of one channel of either rotary magnetic head Ha or Hb to be supplied to sync. data detecting circuit 13 and to track start point detecting circuit 14.

If the predetermined number of the block sync. signals on the slant track T is taken as N, for example, an even number, the counter 15 generates a timing pulse when it counts N/2, or $(N\pm1)/2$ when N is an odd number, block sync. signals from sync. data detecting circuit 13, including the block sync. signal of the leading sync. block, and supplies the timing pulse to a phase comparator circuit 17 which inpart constitutes an error detecting means 23. On the other hand, the segment pulse from segment pulse generating circuit 10 is supplied to a delay circuit 20 which is included in error detecting means 23 in which the segment pulse is delayed by a predetermined time equal to or slightly longer than ½ of the period of the segment pulse so as to make the segment pulse coincident with the normal timing of the timing pulse generated when counter 15 counts N/2 block synchronizing signals. The segment pulse thus delayed is supplied to phase comparator circuit 17 and phase-compared with the timing pulse generated when the counter 15 counts the N/2 of the block synchronizing signals. The compared output from phase comparator circuit 17 is fed to processing circuit 19.

The leading sync. block detecting pulse from track start point detecting circuit 14 and a detecting signal indicative of N block synchronizing signals of one slant track counted by counter 15 are supplied to and then latched in a latch circuit 18.

In processing circuit 19, when the leading sync. block is detected and the number X of the block synchronizing signals contained in one slant track is judged to be equal to N, the fact is displayed on an indicator 22. Also, the compared output from phase comparator circuit 17 is fed as is to the phase modulating circuit 11 to thereby phase-modulate the segment pulse.

Further, in processing circuit 19, if the leading sync. block is not detected or if it is judged that the number X of block synchronizing signals contained in one slant track is not equal to N or that any predetermined conditions are not satisfied, such fact is displayed on indicator 22 and also the compared output from phase comparator circuit 17 is corrected by a correction amount corresponding to each state and then fed to phase modulating circuit 11.

Furthermore, when the tape is started to run or when the video signal is reproduced with a variable tape speed, counter 15 does not generate the timing pulse which is normally generated when it counts N/2 block synchronizing signals. Therefore, at that time, instead of the timing pulse, a dummy pulse is generated by processing circuit 19 and is then fed to phase modulating circuit 11. This is displayed on indicator 22.

Figure 6:
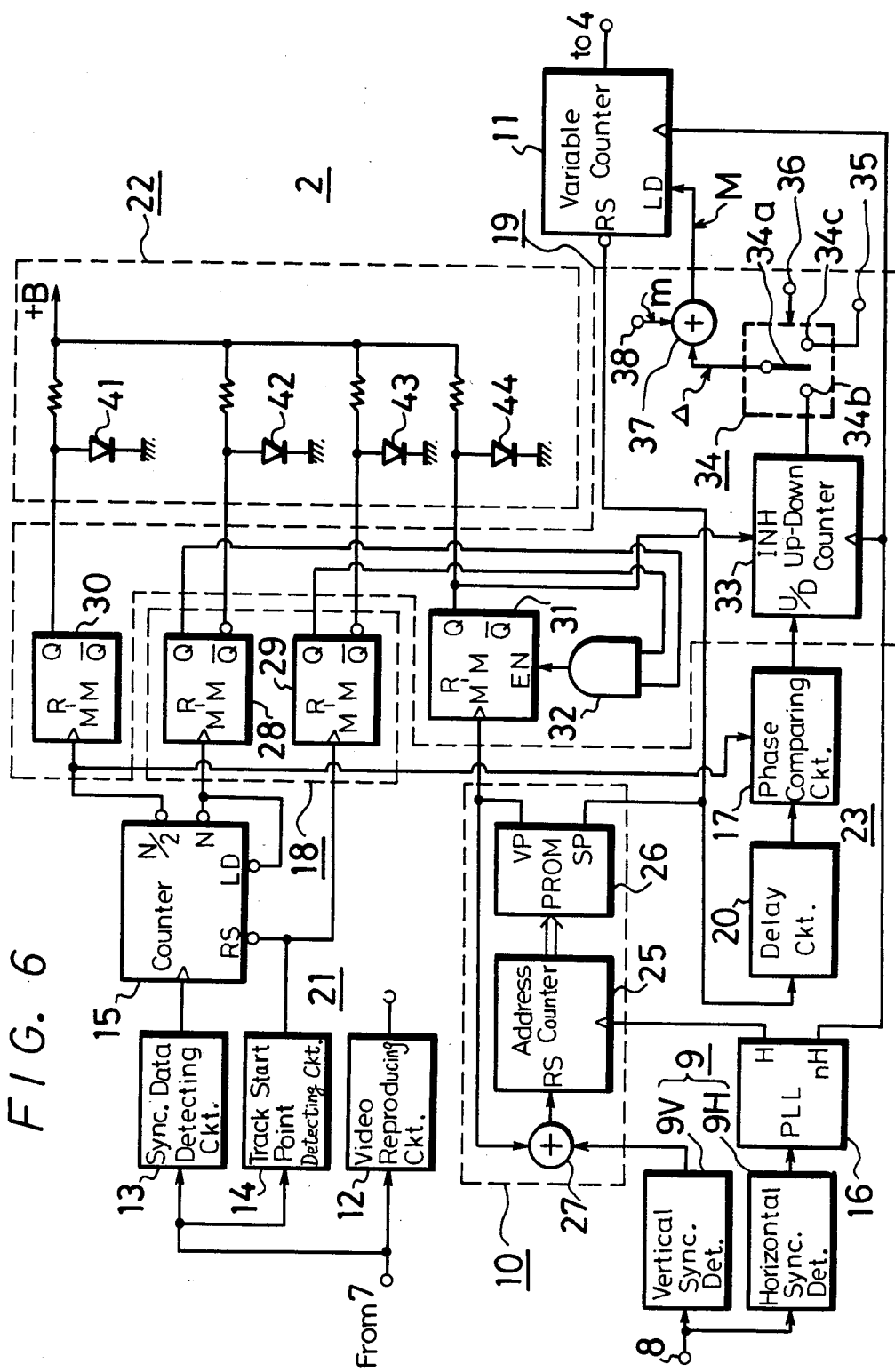
FIG. 6 is a block diagram showing another embodiment of a processor according to the present invention.

Another embodiment of processor 2 according to the present invention will be described with reference to FIG. 6. In FIG. 6, parts corresponding to those of FIG. 1 are marked with the same references and will not be described. Referring to FIG. 6, a horizontal synchronizing signal from a horizontal synchronizing signal detecting circuit 9H which constitutes the sync. data detecting circuit 9 is supplied to a PLL (phase locked loop) circuit 16 which generates a horizontal frequency signal and a clock signal with a frequency n times the frequency of the horizontal frequency signal. In this case, n is selected to be a value ranging, for example, from about 100 to 300.

The segment pulse generating circuit 10 is formed of an address counter 25, a PROM (programmable read only memory) 26 and a synthesizer or composer 27. PROM 26 generates a vertical pulse and a segment pulse on the basis of an address signal from address counter 25. A vertical synchronizing signal from a vertical synchronizing signal detecting circuit 9 V in sync. data detecting circuit 9 and the vertical pulse from PROM 26 are supplied through composer 27 to address counter 25 as a reset pulse. Address counter 25 counts the horizontal frequency signal derived from PLL 16 and is reset by the above mentioned reset pulse.

Counter 15 is constructed such that when it counts N block synchronizing signals, the counted number N is loaded thereto.

The latch circuit 18 includes retriggerable mono-multivibrators 28 and 29 whose astable period is set to be slightly longer than the period of the segment pulse and which are respectively supplied with the detected signal generated from counter 15 when it counts the N block synchronizing signals and the leading sync. block detecting pulse derived from track start point detecting circuit 14.

Now processing circuit 19 will be described, in which reference numeral 30 designates a retriggerable mono-multivibrator similar to retriggerable mono-multivibrators 28 and 29. Retriggerable mono-multivibrator 30 receives the detecting signal generated from counter 15 when it counts N/2 block synchronizing signals. A second retriggerable mono-multivibrator 31 is provided having an astable period set to be slightly longer than several times the vertical period, for example, and is retriggerable mono-multivibrator 31 receives the vertical pulse from segment pulse generating circuit 10. Both the Q outputs from retriggerable mono-multivibrators 28 and 29 are supplied to an AND circuit 32 in processing circuit 19 and the output therefrom is supplied to an enable signal input terminal EN of retriggerable mono-multivibrator 31.

Other circuit elements of processing circuit 19 will now be described. An up-down counter 33, counts the clock signal derived from PLL 16. Up-down counter 33 is controlled in its up-and-down counting by the compared output from phase comparator circuit 17. Also, up-down counter 33 is inhibited from counting the clock signal when the Q output from retriggerable mono-multivibrator 31 becomes low and thereafter it retains the counted value at that time. When the phase of the N/2 detecting signal from counter 15 is advanced from that of the segment pulse from delay circuit 20, the compared output from phase comparator circuit 17 becomes high so that up-down counter 33 is set in the up-counting mode; while, when the phase of the N/2 detecting signal is delayed or is equal to that of the segment pulse, the compared output from phase comparing circuit 17 becomes low so that counter 33 is placed in the down-counting mode.

A change-over switch 34 receives the counted value from the up-down counter 33 at one fixed contact 34b thereof, a zero value from an input terminal 35 at another fixed contact 34c thereof, and the output from its movable contact piece 34a is supplied to an adder 37. Switch 34 is controlled by a control signal from an input terminal 36 so that movable contact piece 34a is normally connected to fixed contact 34b, while when the recording and reproducing apparatus 1 is driven in a playback mode or different speed playback mode, movable contact piece 34a is connected to fixed contact 34c.

Phase modulating circuit 11 will now be described. This phase modulating circuit 11 is formed of a variable counter for counting the clock signal from PLL 16 and which is reset by the segment pulse from PROM 26. Also, an added value M from an adder 37 is loaded to a load terminal LD thereof in which an initial value M is set, and each time this variable counter counts (K−M) clock signals (K is the counted value of counter 11), it generates a pulse. In accordance therewith, a constant m is supplied to adder 37 from an input terminal 38 and a variable Δ is supplied to adder 37 from switch 34. Accordingly, M is presented as $$M=m+\Delta.$$

Indicator 22 will now be described and is provided with light emission diodes (hereinafter simply referred to as LEDs) 41 to 44 which are respectively, for example, blue, red, red and blue. A power supply source +B is adapted to drive LEDs 41 to 44. LED 41 is controlled by retriggerable mono-multivibrator 30 so that when the intermediate point of the length of slant track T is detected, the Q output of retriggerable mono-multivibrator 30 becomes high whereby LED 41 is made to flash. Further, LEDs 42 and 43 are respectively controlled by retriggerable mono-multivibrators 28 and 29 such that when the track end point and the track start point of the slant track T are not detected, the $\overline{Q}$ outputs thereof become high whereby LEDs 42 and 43 are made to flash. The remaining LED 44 is controlled by retriggerable mono-multivibrator 31 such that when the track start point and the track end point of the slant track T are both detected and when the vertical pulse from PROM 26 is generated one or more times during the astable period of retriggerable mono-multivibrator 31, the Q output of retriggerable mono-multivibrator 31 becomes high whereby LED 44 is made to flash. At the same time, up-down counter 33 is changed from the counting state to the hold state and then the counted value is held therein. On the other hand, when the Q output of retriggerable mono-multivibrator 31 becomes low, up-down counter 33 is moved from hold state to the counting state and thus the servo-control is started again.

Although processor 2 is provided with a video recording circuit and other signal processing circuits, they will not be shown and explained.

Furthermore, the present invention is not limited in its application to digital VTR but can be applied to an analog VTR. In addition, the signal to be recorded and reproduced is not limited to a video signal but an audio signal (pulse code modulated signal), a digital data signal and so on may be used.

According to the present invention as set forth above, it is possible to obtain a servo circuit for use with an information signal reproducing apparatus which an control the drum motor so that information recorded on the slant track of the magnetic tape can be positively reproduced without a drop-out.

The above description is given on two preferred embodiments of the invention but it will be apparent that many modifications and variations could be effected by one skilled in the art without departing from the spirit or scope of the invention so that the scope of the invention should be determined by the appended claims only.

We claim as our invention:

1. Servo circuit for use with a reproducing apparatus wherein an information signal is reproduced from a plurality of elongated slant tracks formed on a tape which is wrapped on a periphery of a guide drum having a rotary head, each of said slant tracks having a length extending at a slant angle to a longitudinal direction of said tape and said information signal being formed of a plurality of information portions, comprising:

means for reproducing an information signal representing less than a complete one of said information portions from one of said slant tracks;
means responsive to the reproduced information signal for detecting a middle point along said length of said slant track and generating a timing signal at the detection of the middle point;
means for providing a reference pulse;
phase comparator means for detecting a phase difference between said timing signal and said reference pulse to produce a compared output;
phase modulator means receiving said compared output and said reference pulse for phase modulating said reference pulse in accordance with said phase difference to provide a phase-modulated pulse as a control signal; and
means for controlling a relative position of said slant track relative to said rotary head in accordance with said control signal.

2. Servo circuit according to claim 1, in which the reproduced information signal includes a synchronizing signal, and in which said detecting means includes circuit means for detecting a starting point of said length of said slant track, circuit means connected to said source for separating said synchronizing signal from the reproduced information signal and counter means for counting said synchronizing signal from said separating circuit after reset of said counter means by an output of said starting point detecting circuit means.

3. Servo circuit according to claim 2, in which said reproduced information signal includes N blocks of digital data reproduced from one slant track, where N is an integer greater than 1, each of said blocks having a block synchronizing signal preceding the digital data, and said counter means counts said block synchronizing signals from said separating means up to a count N/2 in said counter means.

4. Servo circuit according to claim 1, in which said phase comparator means includes up-down counter means for counting a clock signal having a predetermined frequency and generating a counting value corresponding to said phase difference.

5. Servo circuit according to claim 4, in which said phase modulator means includes presettable counter means having a load terminal at which said counting value from said up-down counter means is loaded, said clock signal being counted from the loaded counting value to a maximum value in said presettable counter means.

6. Servo circuit according to claim 5, in which said phase comparator means further includes reference pulse generator means having circuit means for separating vertical and horizontal synchronizing signals from a reference video signal, address counter means for counting said horizontal synchronizing signal, said address counter means being reset by said vertical synchronizing signal, and programmable read only memory means connected to an output of said address counter means for generating said reference pulse when said address counter means counts said horizontal synchronizing signal to reach a predetermined value.

7. Servo circuit according to claim 1, in which said information portion of the reproduced information signal is a field of a video signal.

8. Servo circuit for use with a reproducing apparatus wherein an information signal is reproduced from a plurality of elongated slant tracks formed on a tape which is wrapped on a periphery of a guide drum having a rotary head, each of said slant tracks having a length extending at a slant angle to a longitudinal direction of said tape and said information signal being formed of a plurality of information portions, comprising:

means for reproducing an information signal representing less than a complete one of said information portions from one of said slant tracks;
means responsive to the reproduced information signal for detecting a middle point along said length of said slant track and generating a timing signal at the detection of said middle point;
means for providing a reference pulse;
means for detecting a phase difference between said timing signal and said reference pulse;
means for phase-modulating said reference pulse in accordance with said phase difference;
means for generating a position indicating signal corresponding to the rotational position of said rotary head;
means for comparing a phase of the phase-modulated reference pulse with that of said position indicating signal of said rotary head to generate a control signal in accordance therewith;
a motor for driving said rotary head; and
means for controlling a rotation of said motor in response to said control signal.

9. Servo circuit according to claim 8, in which the reproduced information signal includes a synchronizing signal, and in which said middle point detecting means includes circuit means for detecting a starting point of said slant track, circuit means connected to said source for separating said synchronizing signal from the reproduced information signal and counter means for counting said synchronizing signal from said separating circuit means after reset of said counter means by an output of said starting point detecting circuit means.

10. Servo circuit according to claim 9, in which said reproduced information signal includes N blocks of digital data reproduced from one slant track, where N is an integer greater than 1, each of said blocks having a block synchronizing signal preceding the digital data, and said counter means counts said block synchronizing signal from said separating means up to a count N/2 in said counter means.

11. Servo circuit according to claim 8, further comprising a source of a clock signal having a predetermined frequency, and in which said phase difference detecting means include up-down counter means for counting said clock signal and generating a counting value corresponding to said phase difference.

12. Servo circuit according to claim 11, in which said phase-modulating means includes presettable counter means having a load terminal at which said counting value from said up-down counter means is loaded, said clock signal being counted from the loaded counting value to a maximum value in said presettable counter means.

13. Servo circuit according to claim 8, in which said information portion of the reproduced information signal is a field of a video signal.

* * * * *

UNITED STATES PATENT AND TRADEMARK OFFICE
CERTIFICATE OF CORRECTION

PATENT NO. : 4,802,032

DATED : January 31, 1989

INVENTOR(S) : Kaichi Tatsuzawa et al.

It is certified that error appears in the above-identified patent and that said Letters Patent is hereby corrected as shown below:

```
Column 1, line 30, change "rotor" to --motor--;
          line 35, after "and" insert --,--.
Column 2, line  3, after "point," insert --and--.
          line 16, "means for" should start new line.
Column 3, line 23, change "idditionally" to --additionally--;
          line 51, after "Tv" insert --of--;
          line 64, change "semgne" to --segment--.
Column 4, line  1, after "13" insert --and--;
          line  3 after "21" insert --in--;
          line  7, change "describnbed" to --described--;
          line 30, change "inpart" to --in part--.
Column 5, line 51, change "is" to --this--.
Column 6, line  2, change "comparator" to --comparing--;
          line 10, delete "the";
          line 51, delete "the" second occurence.
Column 7, line  7, change "an" to --can-;
          line  8, after "that" insert --the--.
```

UNITED STATES PATENT AND TRADEMARK OFFICE
CERTIFICATE OF CORRECTION

PATENT NO. : 4,802,032

DATED : January 31, 1989

INVENTOR(S) : Kaichi Tatsuzawa et al.

It is certified that error appears in the above-identified patent and that said Letters Patent is hereby corrected as shown below:

Column 9, line 9, change "include" to -- includes --.

Signed and Sealed this

Sixteenth Day of January, 1990

Attest:

JEFFREY M. SAMUELS

Attesting Officer     Acting Commissioner of Patents and Trademarks